United States Patent
Gupta et al.

(10) Patent No.: US 10,768,587 B2
(45) Date of Patent: Sep. 8, 2020

(54) SMART REPLAY IN MANAGEMENT SYSTEMS

(71) Applicant: Siemens Industry, Inc., Alpharetta, GA (US)

(72) Inventors: Kumar Kundan Amar Nath Gupta, Buffalo Grove, IL (US); John Jeffers, Franklin, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 569 days.

(21) Appl. No.: 15/584,710

(22) Filed: May 2, 2017

(65) Prior Publication Data

US 2018/0321644 A1  Nov. 8, 2018

(51) Int. Cl.
| | | |
|---|---|---|
| *G05B 15/02* | (2006.01) | |
| *G05B 23/02* | (2006.01) | |
| *G05B 13/02* | (2006.01) | |
| *G06Q 10/04* | (2012.01) | |
| *G06Q 10/06* | (2012.01) | |
| *G06F 9/48* | (2006.01) | |
| *H02J 13/00* | (2006.01) | |

(52) U.S. Cl.
CPC ........... *G05B 15/02* (2013.01); *G05B 13/024* (2013.01); *G05B 23/0229* (2013.01); *G06F 9/4868* (2013.01); *G06Q 10/04* (2013.01); *G06Q 10/06* (2013.01); *G05B 2219/24055* (2013.01); *G05B 2219/25011* (2013.01); *H02J 13/00001* (2020.01); *H02J 13/0062* (2013.01); *H02J 2203/20* (2020.01)

(58) Field of Classification Search
None
See application file for complete search history.

(56) References Cited

U.S. PATENT DOCUMENTS

2007/0219645 A1*  9/2007  Thomas ................. G05B 15/02
                                                              700/29
2014/0303751 A1*  10/2014  Ibrahim ................. G05B 15/02
                                                              700/9

FOREIGN PATENT DOCUMENTS

WO   WO-2013048427 A1 *  4/2013

OTHER PUBLICATIONS

Automated Logic, "WebCTRL v5.5 User Manual", Apr. 5, 2012, 208 pages. (Year: 2012).*
PCT Search Report dated Jul. 13, 2018, for PCT Application No. PCT/US2018/027882, 13 pages.
(Continued)

*Primary Examiner* — Suzanne Lo (57) ABSTRACT

Methods, mediums, and systems include use of a system manger application in a data processing system to create a replay in a graphical user interface, to receive replay criteria, identify any replay devices, replay sensors, replay actuators, and replay functions corresponding to the replay criteria from among the plurality of devices, sensors, and actuators, identify a replay time period corresponding to the replay criteria, gather replay data for the identified replay devices, replay sensors, replay actuators, or replay functions corresponding to the replay criteria that was generated during the replay time period, and display the replay in the graphical user interface according to the replay data.

20 Claims, 5 Drawing Sheets

(56) References Cited

OTHER PUBLICATIONS

Automatedlogic: "WebCTRL v5.5 User Manual", Apr. 5, 2012, XP055488739, Retrieved from the Internet: URL:https://docuri.com/download/webctrl-v55-user-manual_59cle3a5f58170b286acc7e_pdf on Jun. 28, 2018, 208 pages.

AutomatedLogic—United Technologies, WEBCTRL Time-Lapse Graphics, Demo Video, http://www.automatedlogic.com/pages/product-timelapse.aspx, 2016, 6 Screen shots.

AutomatedLogic—United Technologies, WEBCTRL Building Analytics Brochure, downloaded from www.automatedlogic.com, May 2, 2017, 8 pages.

\* cited by examiner

SMART REPLAY IN MANAGEMENT SYSTEMS

TECHNICAL FIELD

The present disclosure is directed, in general, to automation systems and, more particularly, to graphical user interfaces for a management system in a building automation system capable of automatically creating and displaying a comparative trend view for use in analyzing measured data from devices within the building automation system.

BACKGROUND OF THE DISCLOSURE

Building automation systems encompass a wide variety of systems that aid in the monitoring and control of building operations. Building automation systems include security systems, fire safety systems, and comfort systems that control environmental parameters such as heating, ventilation, and air conditioning ("HVAC") and lighting. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operations may be controlled.

To allow for monitoring and control of the dispersed control system elements, building automation systems often employ multi-level communication networks to communicate operational and/or alarm information between operating elements, such as sensors and actuators, and the centralized control station. Several control stations connected via an Ethernet or another type of network may be distributed throughout one or more building locations, each having the ability to monitor and control system operations.

An important function of a management system for building automation devices involves providing a way for users to quickly and easily view building status and event information and manage the appropriate devices and systems. Improved systems and methods are desirable.

SUMMARY OF THE DISCLOSURE

Various disclosed embodiments include methods, mediums, and systems to "replay" system conditions and events in a graphical user interface. An embodiment includes a method for creating a replay in a graphical user interface of a building management system. The method includes maintaining a system manager application in a data processing system of a management system configured to perform building management system functions and to provide a graphical user interface. The method includes running the system manager application to: receive replay criteria and identify any replay devices, replay sensors, replay actuators, and replay functions corresponding to the replay criteria. The system manager application can identify a replay time period corresponding to the replay criteria. The system manager application can gather replay data for the identified replay devices, replay sensors, replay actuators, or replay functions corresponding to the replay criteria that was generated during the replay time period. The system manager application can display the replay in the graphical user interface according to the replay data.

Another embodiment includes a non-transitory computer-readable medium encoded with executable instructions that is configured to run in a data processing system of a management system, configured to perform building management system functions, and configured to provide a graphical user interface capable and perform processes as described herein. Another embodiment includes a building management system including a data processing system, and a plurality of devices, sensors, and actuators, where the data processing system includes a graphical user interface and executes a system manager application to perform building management system functions and to perform processes as described herein.

In various embodiments, the replay criteria is received from a user. In various embodiments, the replay data is historical data for the identified replay devices, replay sensors, replay actuators, or replay functions, including some or all data points gathered by the identified replay devices, replay sensors, replay actuators, or replay functions during the replay time period. In various embodiments, the replay time period is determined based on the replay criteria by identifying the starting and ending points of the replay time period based on defined data conditions. In various embodiments, the replay criteria includes data conditions based on when one or more data points meet or pass a threshold. In various embodiments, the replay data is historical data for the identified replay devices, replay sensors, replay actuators, or replay functions, including some or all data points gathered by the identified replay devices, replay sensors, replay actuators, or replay functions during the replay time period. In various embodiments, the replay criteria includes a first identified device, and the replay devices include the first identified device and other devices that are necessary for, affect, or are affected by the operation of the identified device.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conceptions and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

An important function of a management system for building automation devices involves the acquisition, storage and display of current and historical data (i.e., trends) for analysis of workflows and processes within a building, plant or other facility. All available process data of a management system can be recorded and applied to optimize the operation of building automation system devices. Changes in measured data of building automation system devices over time is recorded and displayed in a trend view in a graphical user interface of the management system for evaluation. A trend view is a chart area of a display screen where trend data is graphically displayed over a selected time range. The trend view may display data that is currently being generated and stored in a trend database or data that was generated in the past and stored. The trend view could include, for example, the display of a trend curve of room temperature measurements over a period of time in relation to an entered setpoint temperature. A trend view is defined by a user in order to graphically display recorded changes in measured point data over time. The trend view definition involves defining what point data is to be graphically displayed as well as the chart properties required for the desired graphical display. This can include selecting the trend view title, gridlines, scaling, and background associated with the measured data point being analyzed. The trend view definition may include selecting a time range for the X-axis and the position and scales of the Y-axis of the chart. The time range of the displayed data, for example, could be one hour or one month. The trend view definition may also include defining line properties including line thickness and color. A data processing system can save trend views independently of the trend data. Once the trend view is displayed, the time range of the displayed data can be modified by changing the date and time when the time range of the data begins and ends. For example, a trend view chart having an X-axis with an initial time range of one day may be modified by use of a time range scrollbar to select a time range of one month or one year. The start and end dates and times for the time range may also be entered directly.

A trend view can make it much easier to understand complex problems, as compared to using logs or tabular data for individual data points. It still can be difficult to identify the specific time period or portion of data that shows the point of failure, and a trend view can be of limited use if the operator does not know approximately when a problem-related system event occurred.

Various disclosed embodiments include systems, methods and mediums to automatically generate and display a comparative trend view on a graphical user interface of a management system after a system event. Disclosed embodiments provide an intelligent method of configuration of trend views in a management system, and can automatically enable trending on all the related objects or points based on the building control behavior. For example, the system can be configured to detect when a room temperature is 2° over a set point, and automatically start collecting data for replay in a trend view.

Figure 1:
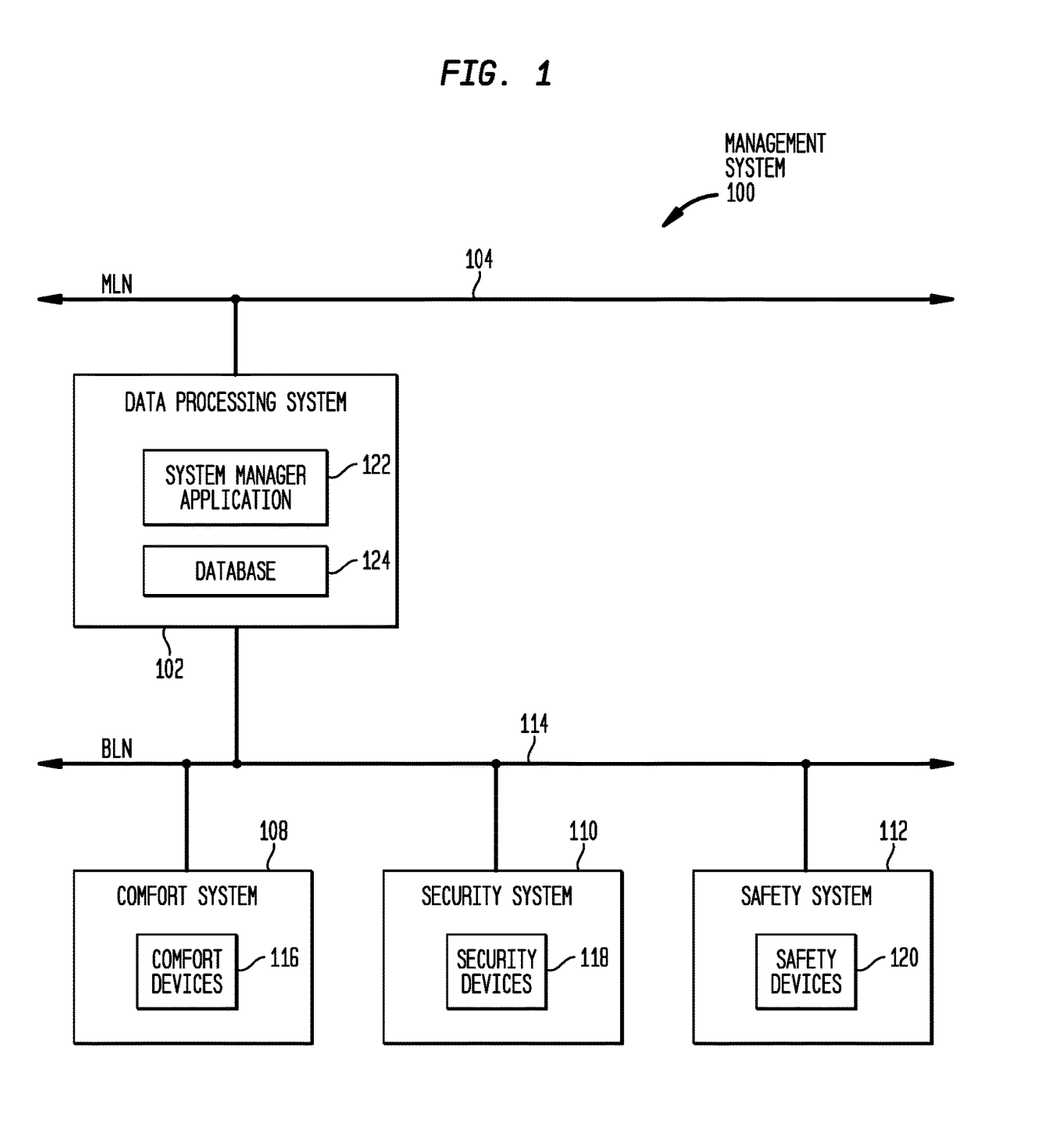
FIG. 1 illustrates a block diagram of a management system in accordance with disclosed embodiments.

FIG. 1 illustrates a block diagram of management system 100 in which various embodiments of the present disclosure are implemented. In this illustrative embodiment, the management system 100 includes a data processing system 102 connected, via a management level network (MLN) 104 to various other data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, data processing system 102 is operably connected to comfort system 108, security system 110, and safety system 112 via building level network (BLN) 114. The comfort system 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the comfort system 108 includes comfort devices 116, the security system 110 includes security devices 118, and the safety system 112 includes safety devices 120. The devices 116-120 may be located inside or in proximity to one or more buildings under the control of the management system 100. The devices 116-120 are configured to provide, monitor, and/or control functions of the comfort system 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a building.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on a data processing system 102. In some embodiments, system manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation," both hereby incorporated by reference. The system manager application 122 is a collection of software and associated data files. The system manager application 122 may include, for example, without limitation, executable files, user layout definition files, rules files, graphics control modules, an infrastructure interface, and/or a number of software extensions. The system manager application 122 provides a user-modifiable and intuitive graphical user interface for allowing a user to monitor, review, and control various building automation system devices. The system manager application 122 provides a user-modifiable and intuitive graphical user interface for interacting with a user using trend views as described herein.

The data processing system 102 includes a database 124 that stores information about the devices 116-120 within the management system 100. A database 124 includes one or more data models of data points, devices, and other objects monitored and controlled by the management system 100. For example, the database 124 may store values for devices in the comfort system 108 (e.g., temperature, alarm status, humidity). These values may each be referred to as a point or data point. The database 124 may also store static information, such as, model numbers, device types, and/or building and room installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects associated with the management system 100 include anything that creates, processes, or stores information regarding data points, such as physical devices (controllers, field panels, sensors, actuators, cameras, etc.) and maintains data files, such as control schedules, trend reports, defined system hierarchies, and the like.

The system manager application 122 may further include software extensions or services that provide operations of the management system 100. For example, the software extensions may include a print manager, a reporting subsystem, and a status propagation manager. For example, a reporting subsystem implemented on a workstation data processing system 102 is a system that manages the acquisition of data values from the database 124 used in the generation of reports as well as comparative trend views.

The data processing system 102 is connected to the BLN 114 and includes one or more hardware and/or software interfaces for sending and receiving information to and from the devices 116-120 in the comfort system 108, the security system 110, and/or the safety system 112. For example, the data processing system 102 may request and receive data regarding a status of one or more devices in the devices 116-120. The system manager application 122, via data processing system 102, also provides a user with the functionality to monitor real-time information about the status of one or more devices and objects associated with the management system 100. The client manager application 122, via server data processing system 102 or client data processing system 106, also provides a user with the functionality to issue commands to control one or more devices and objects associated with the management system 100. For example, one or more of the devices 116-120 may operate on a network protocol for exchanging information with the management system, such as BACnet or LonTalk.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, the building automation systems controlled by the management system 100 may not include one or more of the comfort system 108, the security system 110, and/or the safety system 112.

Figure 2:
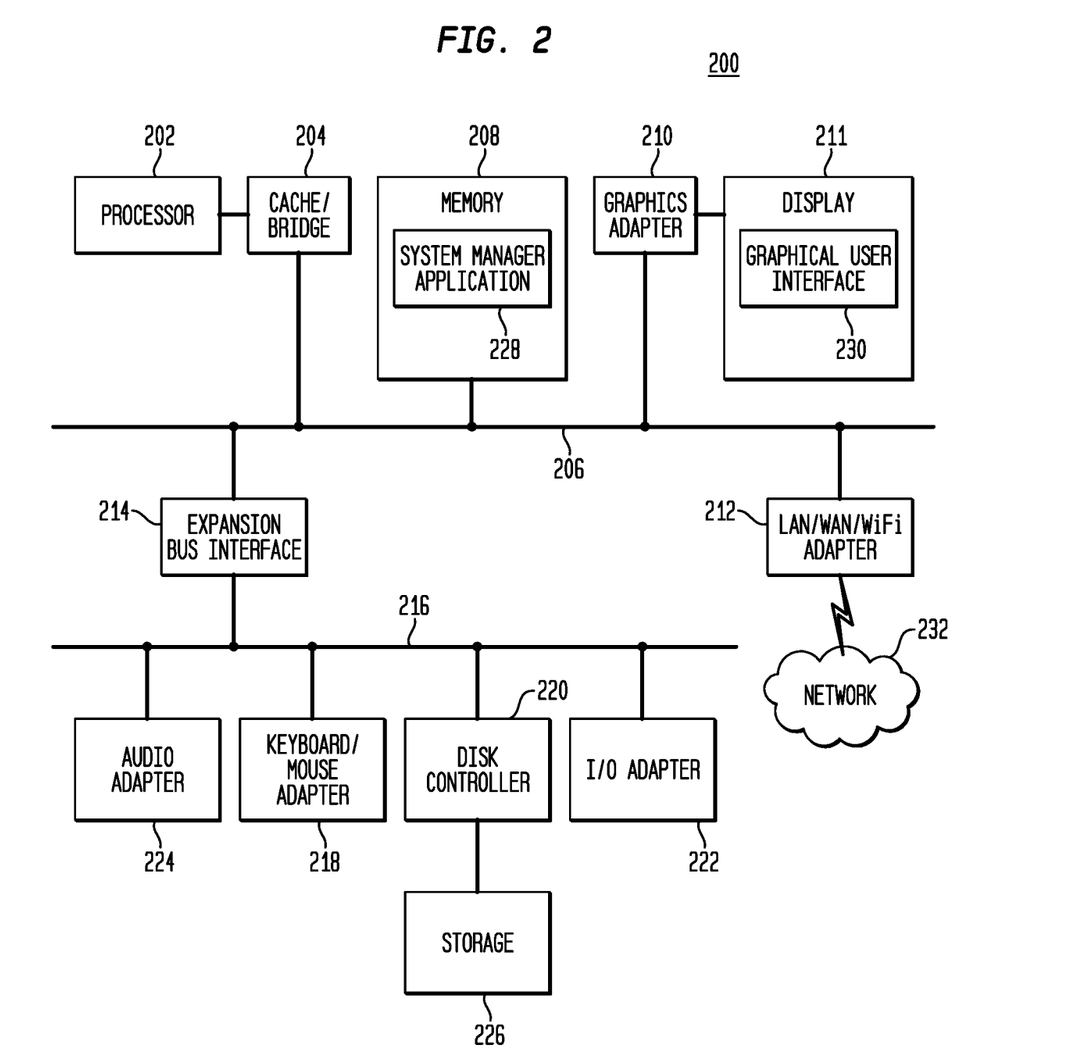
FIG. 2 illustrates a block diagram of a data processing system that may be employed in the management system in FIG. 1 in accordance with disclosed embodiments.

FIG. 2 depicts a block diagram of a data processing system 200 in which various embodiments are implemented. The data processing system 200 is an example of one implementation of the server data processing system 102 in FIG. 1.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as a workstation with all or portions of a system manager application 122 installed in the memory 208 as a system manager application 228. The system manager application 228 is an example of one embodiment of system manager application 122 in FIG. 1. For example, the processor 202 executes program code of the system manager application 228 to generate graphical interface 230 displayed on display 211. In various embodiments of the present disclosure, the graphical user interface 230 provides an interface for a user to view information about and control one or more devices, objects, and/or points associated with the management system 100. The graphical user interface 230 also provides an interface that is customizable to present the information and the controls in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/Wifi adapter 212 may be connected to a network 232, such as, for example, MLN 104 in FIG. 1. As further explained below, the network 232 may be any public or private data processing system network or combination of networks known to those of skill in the art, including the Internet. Data processing system 200 may communicate over network 232 to one or more computers, which are also not part of the data processing system 200, but may be implemented, for example, as a separate data processing system 200.

In various embodiments, system manager application 122 may, via data processing system 102, generate reports of both current trends of values as well as historical trends of values generated within the devices monitored by the management system 100 and display graphical representations of such trends of values on a graphical user interface 230. In addition, in various embodiments, system manager application 122 may, via data processing system 102, automatically generate graphs, tables, charts, or graphic simulations of historical system data in accordance with the embodiments disclosed herein. Simulations can include a graphical representation of appropriate system devices with labels, colors, or other indicators to represent the data being replayed.

In order to solve the issue of tedious configuration, disclosed embodiments include automated processes for choosing historical data points for trend analysis, automatically identifying system events and performing data collection for trend analysis, and automatically configuring trend-view replays of historical data.

The automatic replay can recreate past events in an easy-to-understand, user-friendly graphical interface. This automatic replay can provide a historical view in an intuitive interface, such as viewing the floor plans, equipment graphics, trends, and alarms using data collected over a past period of time so that a user can quickly identify, review, and resolve building control issues.

In various embodiments, in order to efficiently and quickly solve building control issues, the system can present detailed analysis to user at any frozen time interval during the replay of the trend data. Such a "smart pause" function provides the user ability to view a set of graphics by freezing associated graphics and data in time. This aids the user in navigating between different graphics and data for detailed analysis.

The "smart pause" can also display a "smart analysis" to the user around the paused time stamp based on the information from different logging available in the system. For example, the smart analysis can include a system activity log, windows/application logs from a windows event viewer, system diagnostic logs, etc. This will help the user in resolving building control issues. This way, the system displays a view to the user to analyze the issue with not only the details of graphics, trends, or point values of the devices but also a snapshot of different windows and application events.

Figure 3:
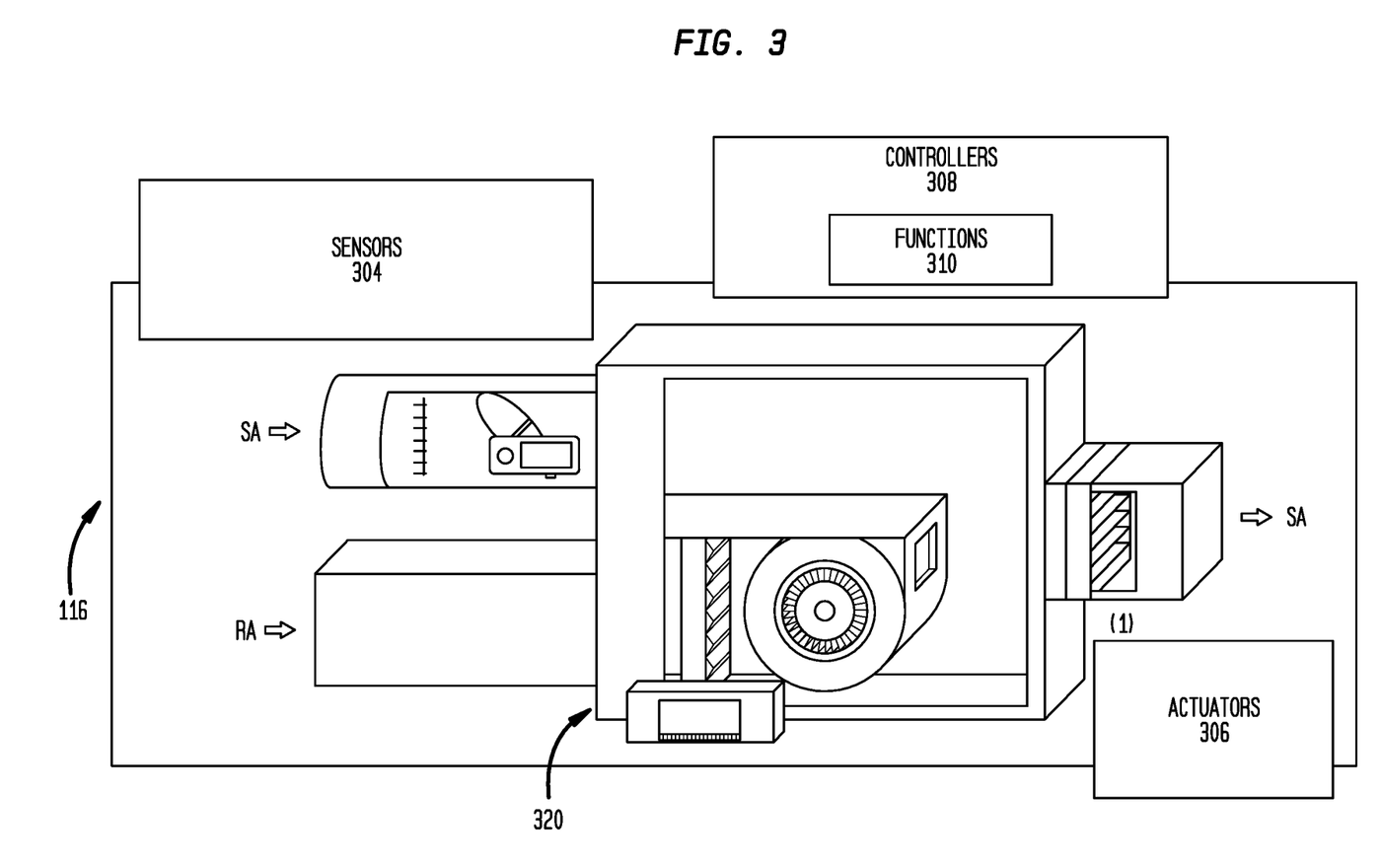
FIG. 3 illustrates an example of a comfort device in accordance with disclosed embodiments.

FIG. 3 illustrates an example of a comfort device 116 in accordance with disclosed embodiments, in this example an air handling unit 302. Each comfort device 116, or other device described above in the management system, can have one or more sensors 304, actuators 306, or controllers 308. Each controller 308 can have one or more associated functions 310 that control, monitor, or otherwise interact with the sensors 304 and actuators 306. Sensors 304 can include any sensors used in the corresponding device, such as thermometers, pressure sensors, airflow sensors, safety sensors such as fire or smoke detectors, motion sensors, heat sensors, or otherwise. Actuators 306 can include any controllable device, such as solenoids, switches, motors, etc. The controller 308 can communicate with data processing system 102, and in some embodiments, data processing system 102 directly acts as the control 308.

In particular, data can stored for each of the sensors 304, actuators 306, controllers 308, or functions 310 that indicate the state, operation, or readings of each of these components, and this data can be stored in database 124 or another storage. This data can include a plurality of data points for each of these elements This data is used by functions 310, controller 308, and data processing system 102 to operate and monitor the management system.

As discussed herein, the accumulated data can be replayed to effectively recreate past events, by automatically selecting the appropriate data for the devices in question, including their associated sensors 304, actuators 306, controllers 308, or functions 310, and "replaying" that data in a graphical user interface 230 as a simulation, trend graph, or other "real time" report for a relevant time period.

Disclosed embodiments allow a user to select replay criteria for the replay. The replay criteria can include selections such as a particular time period, particular devices, and particular data conditions. Given these replay criteria, the system can automatically determine the correct data points and other data to replay.

For example, the system can receive a user selection of a particular time period and device, and in response can automatically determine the required data from the associated sensors 304, actuators 306, controllers 308, or functions 310, and replay that data to give the user an intuitive, graphical view of the operation of the device during that time period, displaying any of the data as graphs, icons, status symbols or colors, numbers, or otherwise as determined by the user or system, including by simulating the operation of the device.

As another example, if a specific device has malfunctioned, the user can select reply criteria based on data conditions. For an HVAC system, for example, the user could select the HVAC device, and select data conditions to start the replay when an intake temperature is two degrees above a set point, and end the replay when a room temperature exceeds six degrees above a setpoint. In this case, the system would automatically determine the required data from the associated sensors 304, actuators 306, controllers 308, or functions 310, identify the time period in which data conditions are met, and reply that data in that time period to give the user an intuitive, graphical view of the operation of the device at the time of the malfunction.

The disclosed "smart replay" allows user to pay needed attention to a possible issue and skip over the data that is not useful.

Figure 4:
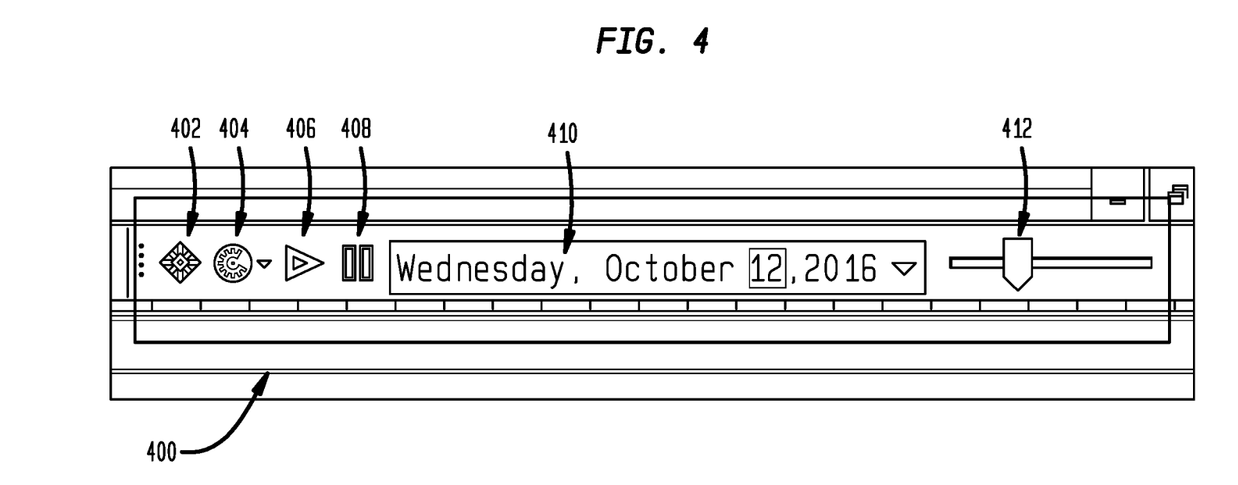
FIG. 4 illustrates an example of graphical user interface controls a replay capability in accordance with disclosed embodiments.

FIG. 4 illustrates an example of graphical user interface controls 400 for one embodiment of such a replay capability. In this example, icon 402 activates the replay features as described herein for the points enabled for trending/replay. After clicking on this icon, rest of the icons of the group will be enabled and selected graphics will move to replay mode.

Icon 404 allows the user to choose the duration of the replay from a specified start date/time. The choices can be, for example, 5 min, 10 min or 15 min.

Icon 406 is a "start" button for the replay, and icon 308 is a "pause" button for the replay.

Time/date area 410 can be used for the user to enter a start date and time for the replay to begin. In other cases, time/date area 410 can be used to display the effective time/date of the replay, showing the exact time and date being represented at each moment by the replay itself.

Slider 412 can be used as a slider bar to "slide" within the chosen time frame, allowing the user to actively move forward or back through the replay. In other cases, slider 412 can represent the passage of time through the replay.

Figure 5:
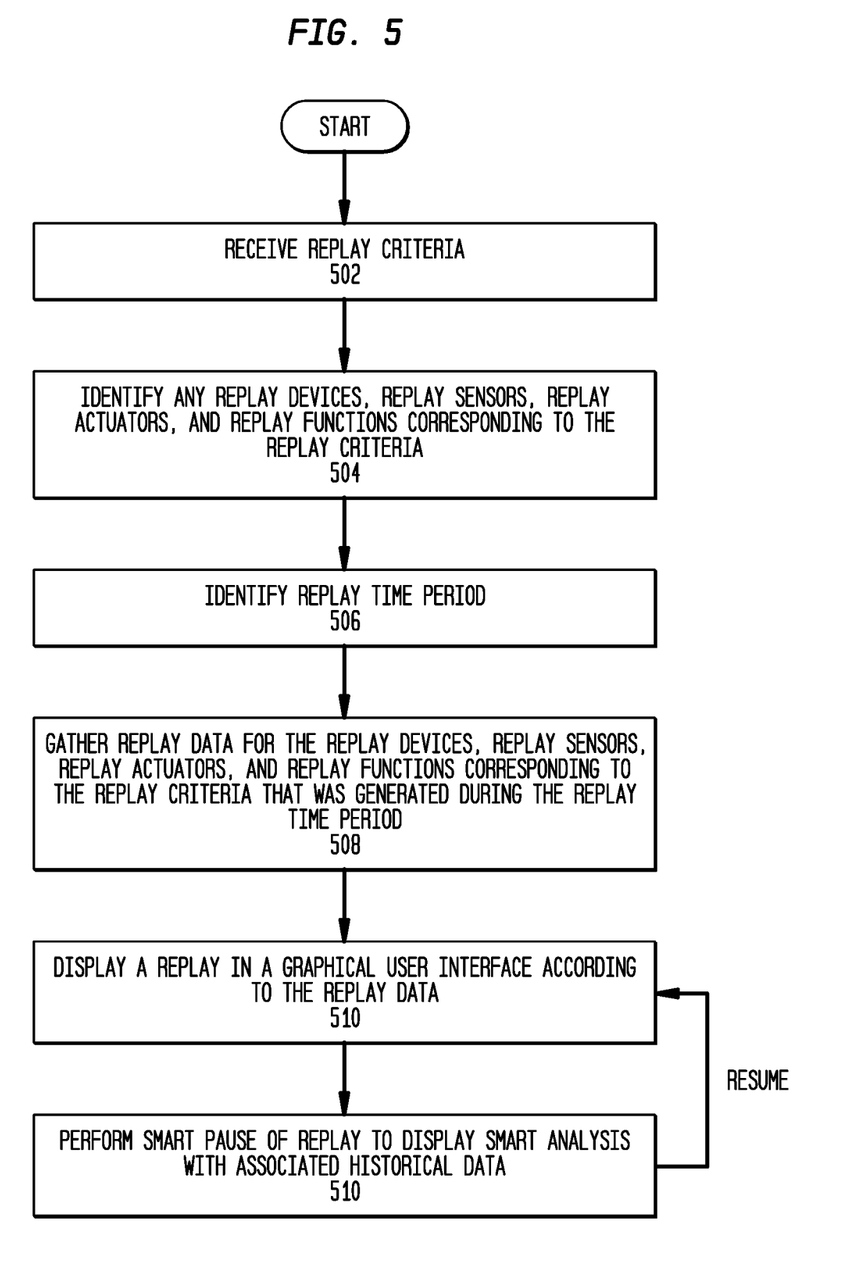
FIG. 5 illustrates depicts a flowchart of a process performed in the management system in accordance with disclosed embodiments.

FIG. 5 depicts a flowchart of an exemplary set of operations that may be executed by a management system to automatically generate and display a replay of historical data as described herein. The process may be implemented by executable instructions stored in a non-transitory computer-readable medium that cause one or more data processing systems to perform such a process. For example, the system manager application 122 may comprise the executable instructions to cause one or more data processing systems to perform such a process. For ease of reference, these are generically referred to as the "system" below.

The system receives replay criteria (502). The replay criteria is typically received from a user, but could be received from another device or process. The replay criteria can include an identification of a time period, devices, or data conditions. In some embodiments, the replay criteria can be a user selection of a previously-generated alert, error, or other indication, and the system automatically determines the appropriate replay time period, replay devices, or replay data conditions corresponding to that indication so that the system can replay the specific events that led to the indication.

The system identifies any replay devices, replay sensors, replay actuators, and replay functions corresponding to the replay criteria (504). For example, if one particular identified device is received at 502, the replay devices may include the identified device and other devices that are necessary for, affect, or are affected by the operation of the identified device, so that the replay shows the interactions and conditions of the corresponding devices. Similarly, the replay sensors, replay actuators, and replay functions are those sensors, actuators, and functions that correspond to the replay criteria in such a way that their historical data is useful for an accurate and complete replay.

The system identifies a replay time period corresponding to the replay criteria (506). The replay time period may have already been included in the reply criteria, or may be determined based on the replay criteria, such as by identifying the starting and ending points of the replay time period based on defined data conditions. For example, if the replay criteria includes data conditions of when certain sensor readings meet or pass thresholds, the system can identify the time points at which those data conditions are met.

The system gathers replay data for the replay devices, replay sensors, replay actuators, and replay functions corresponding to the replay criteria that was generated during the replay time period (508). The replay data is historical data for those elements that is used to produce the replay, including some or all of the data points gathered by those elements during the replay time period.

The system displays a replay in a graphical user interface according to the replay data (510).

The system can, according to a user input, perform a smart pause of the replay to display a smart analysis with associated historical data. The smart pause refers to pausing the replay in the graphical user interface to display historical data corresponding to the point in time at which the replay is paused, and can include any collected data or logging information as described herein. The smart analysis can include not only the details of graphics, trends, or point values of the devices, but can also include a snapshot of different windows, device states, signal states, application events, and any other data related to the various replay devices, replay sensors, replay actuators, and replay functions for that point in time.

Those skilled in the art will recognize that, for simplicity and clarity, the full structure and operation of all data processing systems suitable for use with the present disclosure are not being depicted or described herein. Instead, only so much of a management system as is unique to the present disclosure or necessary for an understanding of the present disclosure is depicted and described. The remainder of the construction and operation of management system 100 may conform to any of the various current implementations and practices known in the art.

Moreover, none of the various features or processes described herein should be considered essential to any or all embodiments, except as described below. Various features may be omitted or duplicated in various embodiments. Various processes described above may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for creating a replay in a graphical user interface of a building management system comprising the steps of:
   maintaining a system manager application in a data processing system of a management system configured to perform building management system functions and to provide a graphical user interface; and
   running the system manager application to:
      receive replay criteria;
      identify any replay devices, replay sensors, replay actuators, and replay functions corresponding to the replay criteria;
      identify a replay time period corresponding to the replay criteria;
      gather replay data for the identified replay devices, replay sensors, replay actuators, or replay functions corresponding to the replay criteria that was generated during the replay time period, wherein the replay data is gathered in response to detecting a room temperature exceeding a set point; and
      display the replay in the graphical user interface according to the replay data.

2. The method of claim 1, wherein the system manager application also performs a smart pause of the replay to display a smart analysis with associated historical data.

3. The method of claim 2, wherein the smart analysis includes one or more of a system activity log, application logs from an event viewer, or system diagnostic logs.

4. The method of claim 1, wherein the replay time period is determined based on the replay criteria by identifying the starting and ending points of the replay time period based on defined data conditions.

5. The method of claim 1, wherein the replay criteria includes data conditions based on when one or more data points meet or pass a threshold.

6. The method of claim 1, wherein the replay data is historical data for the identified replay devices, replay sensors, replay actuators, or replay functions, including some or all data points gathered by the identified replay devices, replay sensors, replay actuators, or replay functions during the replay time period.

7. The method of claim 1, wherein the replay criteria includes a first identified device, and the replay devices include the first identified device and other devices that are necessary for, affect, or are affected by the operation of the identified device.

8. A non-transitory computer-readable medium encoded with executable instructions that, when executed, causes at least one processor to run in a data processing system of a management system, perform building management system functions, and provide a graphical user interface, by:
   receiving replay criteria;
   identifying any replay devices, replay sensors, replay actuators, and replay functions corresponding to the replay criteria;
   identifying a replay time period corresponding to the replay criteria;
   gathering replay data for the identified replay devices, replay sensors, replay actuators, or replay functions corresponding to the replay criteria that was generated during the replay time period, wherein the replay data is gathered in response to detecting a room temperature exceeding a set point; and
   displaying the replay in the graphical user interface according to the replay data.

9. The non-transitory computer-readable medium of claim 8, wherein the building manager system functions also include performing a smart pause of the replay to display a smart analysis with associated historical data.

10. The non-transitory computer-readable medium of claim 9, wherein the smart analysis includes one or more of a system activity log, application logs from an event viewer, or system diagnostic logs.

11. The non-transitory computer-readable medium of claim 8, wherein the replay time period is determined based on the replay criteria by identifying the starting and ending points of the replay time period based on defined data conditions.

12. The non-transitory computer-readable medium of claim 8, wherein the replay criteria includes data conditions based on when one or more data points meet or pass a threshold.

13. The non-transitory computer-readable medium of claim 8, wherein the replay data is historical data for the identified replay devices, replay sensors, replay actuators, or replay functions, including some or all data points gathered by the identified replay devices, replay sensors, replay actuators, or replay functions during the replay time period.

14. The non-transitory computer-readable medium of claim 8, wherein the replay criteria includes a first identified device, and the replay devices include the first identified device and other devices that are necessary for, affect, or are affected by the operation of the identified device.

15. A building management system comprising a data processing system, and a plurality of devices, sensors, and actuators, wherein the data processing system includes a graphical user interface and executes a system manager application to perform building management system functions and to:
- receive replay criteria;
- identify any replay devices, replay sensors, replay actuators, and replay functions corresponding to the replay criteria;
- identify a replay time period corresponding to the replay criteria;
- gather replay data for the identified replay devices, replay sensors, replay actuators, or replay functions corresponding to the replay criteria that was generated during the replay time period, wherein the replay data is gathered in response to detecting a room temperature exceeding a set point; and
- display the replay in the graphical user interface according to the replay data.

16. The building management system of claim 15, wherein the system manager application also performs a smart pause of the replay to display a smart analysis with associated historical data.

17. The building management system of claim 16, wherein the replay time period is determined based on the replay criteria by identifying the starting and ending points of the replay time period based on defined data conditions.

18. The building management system of claim 15, wherein the replay criteria includes data conditions based on when one or more data points meet or pass a threshold.

19. The building management system of claim 15, wherein the replay data is historical data for the identified replay devices, replay sensors, replay actuators, or replay functions, including some or all data points gathered by the identified replay devices, replay sensors, replay actuators, or replay functions during the replay time period.

20. The building management system of claim 15, wherein the replay criteria includes a first identified device, and the replay devices include the first identified device and other devices that are necessary for, affect, or are affected by the operation of the identified device.

* * * * *